United States Patent
Kreis et al.

(10) Patent No.: US 11,878,753 B2
(45) Date of Patent: Jan. 23, 2024

(54) STEERING ASSISTANCE METHOD BASED ON A DRIVER ASSISTANCE METHOD, STEERING ASSISTANCE SYSTEM AND TRANSPORTATION VEHICLE

(71) Applicant: VOLKSWAGEN AKTIENGESELLSCHAFT, Wolfsburg (DE)

(72) Inventors: Christopher Kreis, Braunschweig (DE); Tobias Rüger, Braunschweig (DE)

(73) Assignee: VOLKSWAGEN AKTIENGESELLSCHAFT

( * ) Notice: Subject to any disclaimer, the term of this patent is extended or adjusted under 35 U.S.C. 154(b) by 129 days.

(21) Appl. No.: 16/496,047

(22) PCT Filed: Jan. 16, 2018

(86) PCT No.: PCT/EP2018/051020
§ 371 (c)(1),
(2) Date: Sep. 20, 2019

(87) PCT Pub. No.: WO2018/171950
PCT Pub. Date: Sep. 27, 2018

(65) Prior Publication Data
US 2020/0023895 A1    Jan. 23, 2020

(30) Foreign Application Priority Data
Mar. 24, 2017   (DE) ................. 10 2017 205 030.6

(51) Int. Cl.
*B62D 5/04*   (2006.01)
*B62D 6/08*   (2006.01)

(52) U.S. Cl.
CPC ............. *B62D 6/08* (2013.01); *B62D 5/0463* (2013.01)

(58) Field of Classification Search
CPC .. B62D 15/025; B62D 5/0463; B62D 5/0481; B62D 6/008; B62D 6/08
See application file for complete search history.

(56) References Cited

U.S. PATENT DOCUMENTS

| | | | |
|---|---|---|---|
| 10,407,096 B2* | 9/2019 | Moretti | B62D 15/0265 |
| 2017/0015351 A1* | 1/2017 | Endo | B62D 6/00 |

(Continued)

FOREIGN PATENT DOCUMENTS

| | | |
|---|---|---|
| DE | 102006031766 A1 | 9/2007 |
| DE | 102008036772 A1 | 2/2010 |

(Continued)

OTHER PUBLICATIONS

Search Report for International Patent Application No. PCT/EP2018/051020; dated May 7, 2018.

*Primary Examiner* — Jeff A Burke
*Assistant Examiner* — Zachary Joseph Wallace
(74) *Attorney, Agent, or Firm* — Barnes & Thornburg LLP (57) ABSTRACT

A steering assistance method based on a driver assistance system, for a transportation vehicle with a steering system with steering assistance for assisting a driver during the steering of the transportation vehicle by the steering system, in which a driving situation of the transportation vehicle is detected; acting upon the driving behavior of the transportation vehicle according to the driving situation, the supporting driver assistance system defining a nominal value for at least one regulating variable of the steering system and conditionally requesting same from the steering system by a driver assistance interface; and generating a corrective action by a monitoring function downstream of the driver assistance interface and upstream of the request to the steering system, in response to the nominal value not meet- (Continued)

ing a pre-defined permissible criterion. A steering assistance based on a driver assistance system and a transportation vehicle.

21 Claims, 6 Drawing Sheets

(56) References Cited

U.S. PATENT DOCUMENTS

| | | | |
|---|---|---|---|
| 2018/0009469 A1* | 1/2018 | March | B62D 5/049 |
| 2018/0281848 A1* | 10/2018 | Zegelaar | B62D 15/024 |
| 2018/0370531 A1* | 12/2018 | Matsunaga | B60R 21/00 |
| 2019/0126975 A1* | 5/2019 | Prahlad | B62D 5/0463 |

FOREIGN PATENT DOCUMENTS

| | | |
|---|---|---|
| DE | 102008038882 A1 | 2/2010 |
| DE | 102009051471 A1 | 5/2011 |
| DE | 102010062499 A1 | 6/2012 |
| DE | 102013214401 A1 | 2/2015 |
| EP | 2223836 A1 | 9/2010 |
| FR | 3026708 A1 | 4/2016 |

* cited by examiner

STEERING ASSISTANCE METHOD BASED ON A DRIVER ASSISTANCE METHOD, STEERING ASSISTANCE SYSTEM AND TRANSPORTATION VEHICLE

PRIORITY CLAIM

This patent application is a U.S. National Phase of International Patent Application No. PCT/EP2018/051020, filed 16 Jan. 2018, which claims priority to German Patent Application No. 10 2017 205 030.6, filed 24 Mar. 2017, the disclosures of which are incorporated herein by reference in their entireties.

SUMMARY

Illustrative embodiments relate to a driver-assistance-system-based steering assistance method for a transportation vehicle, to a steering assistance system and to a transportation vehicle as such.

BRIEF DESCRIPTION OF THE DRAWINGS

Disclosed embodiments will be described in more detail with reference to the figures, in which.

DETAILED DESCRIPTION

Steering assistance methods and steering assistance systems and driver assistance systems which relate thereto are configured to assist, in accordance with the driving situation of the transportation vehicle, a driver when steering the transportation vehicle, specifically by conditional and controlled interventions into the steering system in that, for example, if appropriate an actuating torque is requested from the underlying steering system of the transportation vehicle in addition to a torque which is applied by the driver, and the actuating torque is applied by the steering system.

It is problematic in conventional steering assistance methods and steering assistance systems which interact with a driver assistance system that, firstly, there is a lack of testability and plausibility checking of the request signals which are output by the driver assistance system for the steering system and, in particular, for the steering assistance system, and that, secondly, there is a lack of flexibility with respect to various transportation vehicle types or transportation vehicle classes owing to the comparatively fixed and specific configuration of the transportation vehicle.

The disclosed embodiments provide a driver-assistance-system-based steering assistance method and a steering assistance system which provide an increased degree of driving safety for a user and, owing to their higher degree of flexibility, can be used in a multiplicity of transportation vehicle types and transportation vehicle classes. In addition, a transportation vehicle which can be operated with such a method and/or system is to be provided.

Disclosed embodiments provide a driver-assistance-system-based steering assistance method, with a driver-assistance-system-based steering assistance system, and with a transportation vehicle.

According to a first disclosed embodiment, a driver-assistance-system-based steering assistance method is provided for a transportation vehicle with a steering system with steering assistance and, in particular, for a transportation vehicle for assisting a driver when steering the transportation vehicle by the steering system, in which (i) a driving situation of the transportation vehicle is sensed, (ii) intervention into the driving behavior of the transportation vehicle is carried out in accordance with the driving situation in that the underlying driver assistance system determines a setpoint value for at least one control variable of the steering system and conditionally requests the setpoint value from the steering system via a driver assistance interface, (iii) wherein a monitoring function which is connected downstream of the driver assistance interface and connected upstream of the request to the steering system brings about a fault action if the setpoint value does not satisfy a predefined permissibility criterion.

A core property if the disclosed embodiments is therefore to test a request, which is imminent but not yet made, by a driver assistance system for permissibility to prevent a request by the driver assistance system which is actually made to the steering system from causing the transportation vehicle to enter a driving situation in which the driver can no longer control the transportation vehicle.

A high degree of permissibility and safety are obtained for the user if, according to one optional refinement of the steering assistance method, setpoint values, determined by the driver assistance system by the monitoring function, of a plurality of control variables are monitored, in particular, in a parallel state, in a simultaneous state, by an OR logic operation and/or by summation, or some other type of common processing.

Depending on the application, it is possible for different scenarios to be conceivable as fault actions, to avoid a hazardous driving situation from coming about for the transportation vehicle, or to return the transportation vehicle to a safe driving situation.

Therefore, in at least one exemplary embodiment of the disclosed steering assistance method there is provision that the fault action causes a setpoint value, determined by the driver assistance system, of a control variable not to be requested by the steering system.

Alternatively or additionally there can be provision that the fault action causes a setpoint value, determined by the driver assistance system, of a control variable to be newly determined and monitored by the driver assistance system and conditionally requested by the steering system.

Furthermore, it is conceivable that according to another exemplary embodiment of the disclosed driver-assistance-based steering assistance method the fault action causes a safe equivalent setpoint value to be made available and monitored by the monitoring function and/or by the driver assistance system and to be conditionally requested by the steering system.

All these measures are appropriate in conjunction with all the control variables which can be influenced by the driver assistance system.

In specific applications, the control variables which are actually used can assume a quite different form and be combined with one another in a complex way.

Therefore, according to at least one exemplary embodiment of the disclosed steering assistance method it is possible that the value of a steering assistance force, the value of a steering assistance torque, the value of a steering angle and/or a value related to a position and/or orientation of an underlying actuator unit, for example, a servomotor or the like, and/or of a steering element, for example, a steering rack or steering rail, activated thereby are/is used as a control variable.

The permissibility and safety of the disclosed steering assistance method can be increased further in that during the testing of the permissibility criterion the monitoring function tests a plurality of partial criteria, in particular, from a predefined set of partial criteria, in a simultaneous and/or parallel state. This means that different monitoring processes relating to different control variables can be carried out simultaneously and in parallel.

In this context, it is of benefit if the permissibility criterion or a partial criterion is detected or are detected as not being satisfied if the setpoint value, determined by the driver assistance system, of the at least one control variable of the steering system corresponds to a driving situation which a driver of the transportation vehicle cannot cope with.

To concretize the circumstances which permit a permissibility criterion or a partial criterion to be tested, formulate relations and/or pre-fabricated readout tables, for example, lookup tables, wherein values of measurement variables, which are characteristic of the driving situation and the operating state of the transportation vehicle, are input as parameters for evaluation.

For this purpose, in the text which follows further concretized scenarios are described:

In at least one exemplary embodiment of the disclosed steering assistance method there is provision that the monitoring function carries out maximum value monitoring of a setpoint value of a control variable.

The permissibility criterion or a partial concriterion can be detected as not satisfied if the absolute value of the setpoint value of the control variable exceeds a predefined and/or prescribed maximum permissible absolute value. This criterion can be applied to various control variables such as have been specified above by way of example.

In another exemplary embodiment of the disclosed steering assistance method there is provision that the monitoring function carries out monitoring of a gradient of a or the setpoint value of a control variable.

The permissibility criterion or the partial criterion can be detected as not satisfied if the value of the gradient of a setpoint value of a control variable and/or of the control variable itself exceeds a predefined upper limit and/or undershoots a predefined lower limit.

In this context short-term and/or high-frequency fluctuations in the setpoint value, in relation to the magnitude of the setpoint value, and/or of the control variable, are treated in terms of a low-pass filter, so that short-term and/or high-frequency fluctuations are permissible without triggering of a fault action and/or of a request to the steering system occurring.

Alternatively or additionally, there may be provision that the monitoring function carries out monitoring in terms of oversteerability.

The permissibility criterion or a partial criterion can be detected as not satisfied if the setpoint value of the output force FPosition, used as a control variable, of an underlying actuator unit as the position encoder of the steering system exceeds an upper force limit Fpos,Limit and/or undershoots a lower force limit Fneg,Limit.

In this context there may be provision that the upper force limit Fpos,Limit and/or the lower force limit Fneg,Limit, are/is, for example, also adapted dynamically in accordance with the steering force assistance by the steering system and/or by a steering torque which is applied manually by the driver.

Additionally or alternatively there may be provision that the upper force limit Fpos,Limit and/or the lower force limit Fneg,Limit are determined according to the following relationships (1) to (4), specifically according to $$F_{pos,Limit}(M_{Sensor}, F_{Assistance}) = \qquad (1)$$
$$F_{max} + \frac{(F_{max} - F_{min}) \cdot M_{Sensor}}{M_{max}} - \min(F_{Assistance}, 0),$$

if only a lower opposing torque is applied to the steering system of the transportation vehicle by the driver, and therefore $M_{sensor} > -M_{max}$, according to $$F_{pos,Limit}(M_{Sensor}, F_{Assistance}) = \qquad (2)$$
$$F_{min} + \min(F_{Assistance}, 0) \cdot \frac{M_{max}}{2 \cdot M_{Sensor} + M_{max}},$$

if a high opposing torque is applied to the steering system of the transportation vehicle by the driver, and therefore $M_{Sensor} \leq -M_{max}$, according to $$F_{neg,Limit}(M_{Sensor}, F_{Assistance}) = \qquad (3)$$
$$-F_{max} + \frac{(F_{max} - F_{min}) \cdot M_{Sensor}}{M_{max}} - \max(F_{Assistance}, 0)$$

if only a low opposing torque is applied to the steering system (20) of the transportation vehicle (1) by the driver and therefore $M_{sensor} < M_{max}$ and/or according to $$F_{neg,Limit}(M_{Sensor}, F_{Assistance}) = \qquad (4)$$
$$-F_{min} - \max(F_{Assistance}, 0) \cdot \frac{M_{max}}{2 \cdot M_{Sensor} - M_{max}},$$

if a high opposing torque is applied to the steering system (20) of the transportation vehicle (1) by the driver and therefore $M_{Sensor} \geq -M_{max}$.

In this context, Fpos,Limit denotes the upper force limit, Fneg,Limit denotes the lower force limit, MSensor denotes the manual torque which is measured by a sensor and applied by the driver of the transportation vehicle (1), MMax denotes the maximum steering torque, Fassistance denotes the currently applied steering assistance force, Fmin denotes a minimum force, Fmax denotes a maximum force, min denotes the minimum function and max denotes the maximum function.

According to another exemplary embodiment of the disclosed steering assistance method there is provision that the monitoring function carries out monitoring of the position of a setpoint value of a control variable with respect to a permissibility range. The latter is defined by a currently present speed of an underlying actuator unit and/or of a steering element which is activated thereby, in particular, a steering rack.

In this context, the permissibility criterion or a partial criterion can be detected as not satisfied if the setpoint value lies outside the current permissibility range or a current permissibility range, wherein a current value of a speed of the transportation vehicle can be taken into account when defining the permissibility range.

Additionally or alternatively, there may be provision that for the purpose of plausibility checking, the monitoring function tests whether in the case of a setpoint value for the control variable which is different from zero the underlying driver assistance system makes a request to the steering system.

Also, additionally or alternatively status information which happens to occur on the underlying driver assistance system can be acquired and evaluated to control the monitoring function further.

In addition, it is also possible to provide as additional or alternative measures that the monitoring function is configured to extend parameter boundaries when monitoring a setpoint value of a control variable at speeds of the transportation vehicle which undershoot a predefined minimum speed of 12 km/h.

Furthermore, when a driver is present in the transportation vehicle, contact of a driver with the steering wheel of the steering system and/or inertia of the steering wheel (21), of the steering column and/or of the steering shaft (22) can be sensed and taken into account.

According to the disclosed embodiments, malfunctions can be reliably avoided if, according to another exemplary embodiment of the disclosed steering assistance method, in addition to an implementation as a first monitoring unit in the region of the monitoring plane of the steering system the monitoring function is embodied with a second implementation as a second monitoring unit in the region of the steering function plane of the steering system.

According to a further exemplary embodiment a driver-assistance-system-based steering assistance system, which can also be referred to as driver-assistance-system-based steering assistance, is provided which serves to assist a driver of a transportation vehicle when steering the transportation vehicle. In this context, a sensing and control unit is embodied which is configured to carry out a disclosed driver-assistance-system-based steering assistance method.

In addition, the disclosed embodiments also provide a transportation vehicle which is embodied with a steering system with driver-assistance-system-based steering assistance for the steering of a movement of the transportation vehicle by a driver. The steering assistance is provided in the disclosed embodiments.

Exemplary embodiments are described in detail below with reference to FIGS. 1 to 6. Identical and equivalent as well as identically or equivalently acting elements and components are denoted by the same reference symbols. Detailed description of the denoted elements and components is not represented in every case of their occurrence.

The illustrated features and further properties can be isolated from one another in any desired form and combined with one another as desired without departing from the core of the disclosure.

Figure 1:
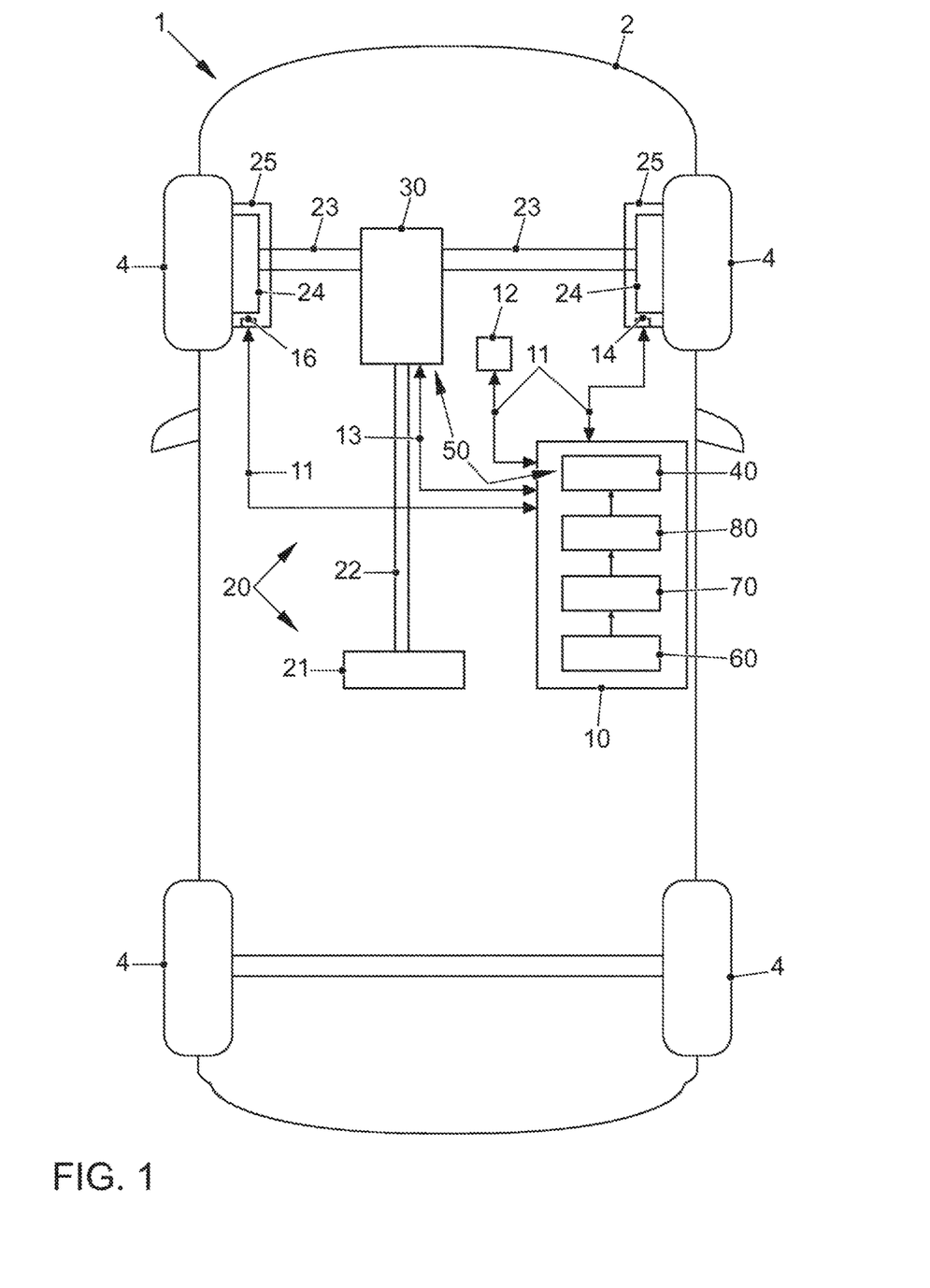
FIG. 1 shows a schematic view of an exemplary embodiment of the disclosed transportation vehicle using an exemplary embodiment of the disclosed steering assistance and/or with the execution of an exemplary embodiment of the disclosed driver-assistance-system-based steering assistance method.

FIG. 1 shows a schematic view of an exemplary embodiment of the transportation vehicle 1 using an exemplary embodiment of the steering assistance system 50, which is also referred to for short below as steering assistance and/or steering assistance method.

The transportation vehicle 1 has a frame or bodywork 2 and wheels 4 which are accommodated therein for locomotion. The front wheels 4 can be steered by a steering system 20 as steering by a steering wheel 21 and a steering shaft 22 which is attached thereto, and adjoining track rods, steering rail or steering rack 23, which are connected to the wheels 4 via wheel carriers 25 corresponding to steering joints 24.

In addition to or as an alternative to a steering torque which is applied by the driver via the steering wheel 21, the disclosed steering assistance system 50 which is provided can generate an actuating torque with the sensing and control unit 10 and the actuation unit 30 and can introduce it into the steering system 20 for steering the wheels 4 by activating the actuator unit 30.

In this context, the steering assistance system 50 is decisively influenced by a driver assistance system 60 which makes requests to the steering system 50 via a driver assistance interface 70 for more highly automated driving in that the steering assistance 50 acts, for example, on the steering assistance controller 40, for example, by requests, to form corresponding actuating forces, actuating torques and/or actuating angles via the actuator unit 30.

Transportation vehicle parameters and/or driving parameters for characterizing a driving situation and/or the driving behavior of the transportation vehicle 1 can be acquired via sensors 12, 14 and 16 which are connected to the sensing and control unit 10 via a sensing and control line 11. These parameters are fed to the steering assistance controller 40 and/or the driver assistance system 60 and processed there.

In this context, a steering angle, a yaw angle, a wheel speed, a torque which is applied via the steering wheel 21 and which is also referred to as a manual torque or driver torque, an actuating torque which is applied via the actuator unit 30 and whose rates of change and/or the respective second derivative over time (accelerations) thereof can be acquired via the sensors 12, 14, 16. Furthermore, orientations, actuations, positions and their changes over time—for example, in the sense of a speed, an angular speed, an acceleration, an angular acceleration—can be sensed with respect to a track rod 23, a steering rack or steering rail, a joint 24 and/or a wheel carrier 25.

The values which are acquired by the sensing and control unit 10 can be used to bring about—for example, after evaluation by the steering assistance controller 40 and/or by the driver assistance system 60—activation of the actuator 30 which corresponds to the driving situation and/or the driving behavior of the transportation vehicle 1, via the additional sensing and control line 13, to generate an adapted actuating torque in the steering system 20 and impress it on the wheels 4.

According to the disclosed embodiments, a monitoring function 80 is formed in relation to the sensing and/or control unit 10 according to FIG. 1 and the driver assistance system 60 contained therein, in relation to the steering assistance 50 and the steering assistance controller 40 for influencing the steering system 20. The monitoring function 80 is provided according to the disclosed embodiments, connected downstream of the driver assistance interface 70 and upstream of the steering assistance controller 40, to which requests by the driver assistance system 60 are directed.

By virtue of the provision of the monitoring function 80 it becomes possible to test a request of the driver assistance system 60 to the steering system 20, specifically imparted via the steering assistance controller 40 of the steering assistance 50, before the actual execution and, if appropriate, to modify or suppress it, to prevent the transportation vehicle 1 either remaining in a driving situation which a driver can no longer cope with, or else getting into such a driving situation which cannot be coped with.

Figure 2:
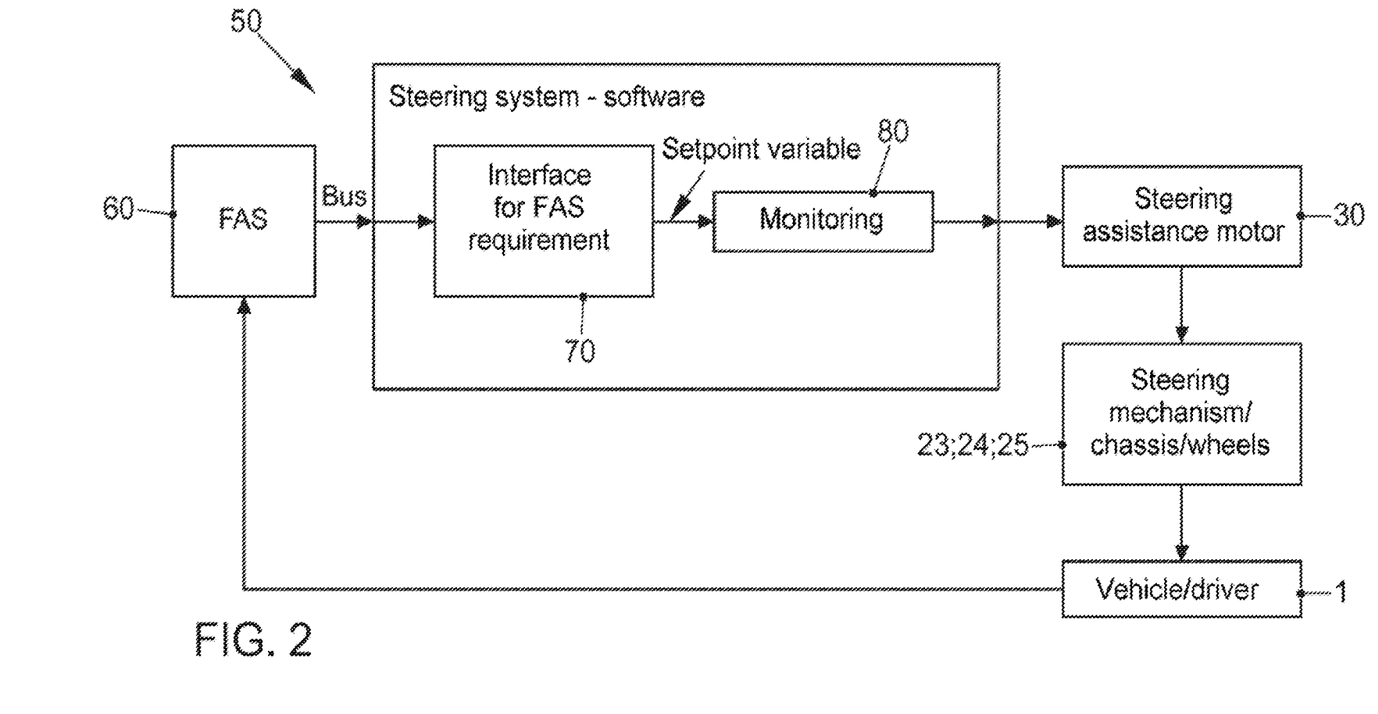
FIG. 2 shows a block diagram showing an exemplary embodiment of the disclosed steering assistance system which is used.

FIG. 2 shows, in the manner of a block diagram, an exemplary embodiment of the disclosed steering assistance system 50, which is used, of a steering system 20 with a driver assistance system 60 which conditionally directs corresponding requests to the steering system 20 imparted by a steering assistance controller 40 of the steering assistance 50.

Figure 3:
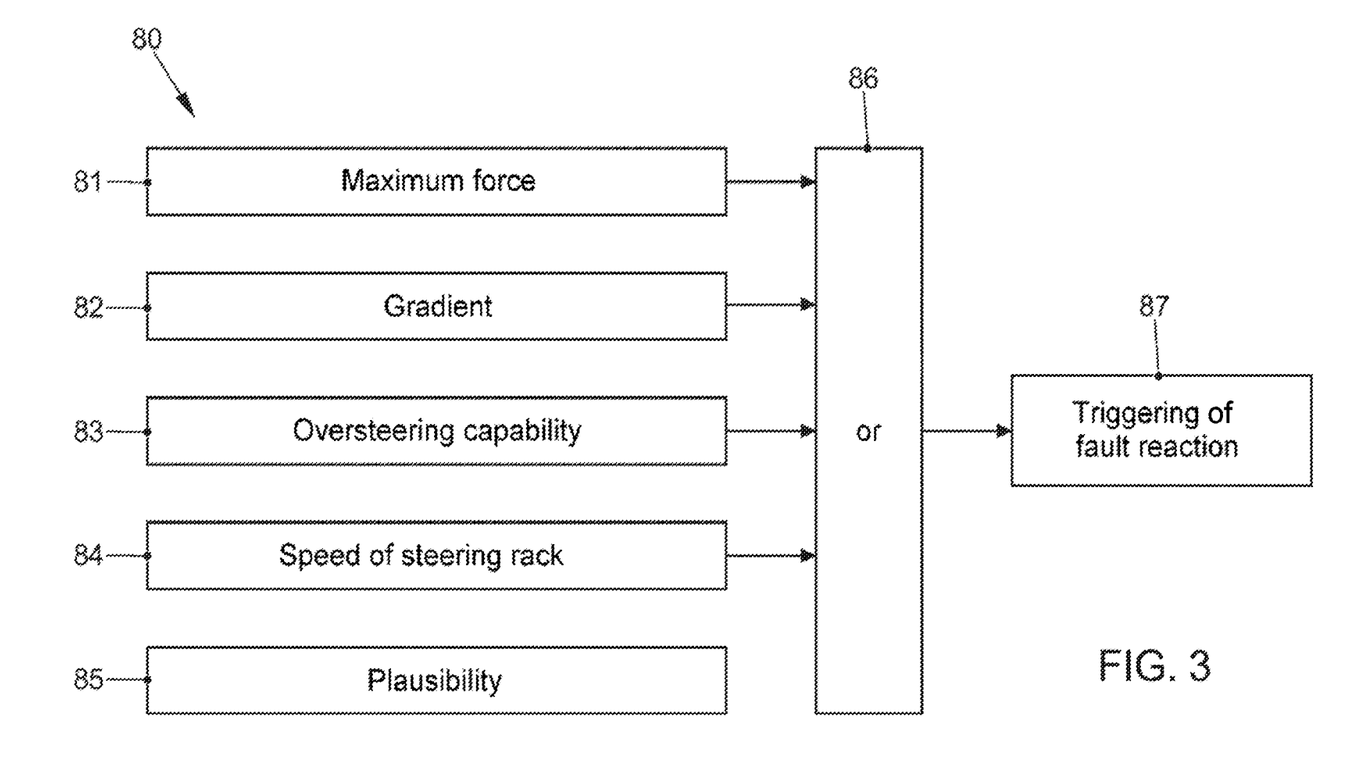
FIG. 3 shows a block diagram showing an exemplary embodiment of the disclosed monitoring function which is used.

FIG. 3 shows, in the manner of a block diagram, an exemplary embodiment of the disclosed monitoring system 80 which is used.

The monitoring function which is illustrated in FIG. 3 has five simultaneous and/or parallel processes 81 to 85 for monitoring, specifically a maximum value, a gradient, oversteerability, an actuator speed or a speed of a steering element 23, 24, 25, in particular, of the speed of a steering rack or of a steering rail of the steering system 20, and the plausibility, the latter, for example, on the basis of status information which can be output by the driver assistance system 60.

The results of the monitoring processes 81 to 85 of the monitoring function 80 are logically coupled by a logic operation 86, for example, by an OR logic operation, wherein the result which is obtained leads conditionally and/or in a controlled state to the triggering of a fault reaction 87.

Figure 4:
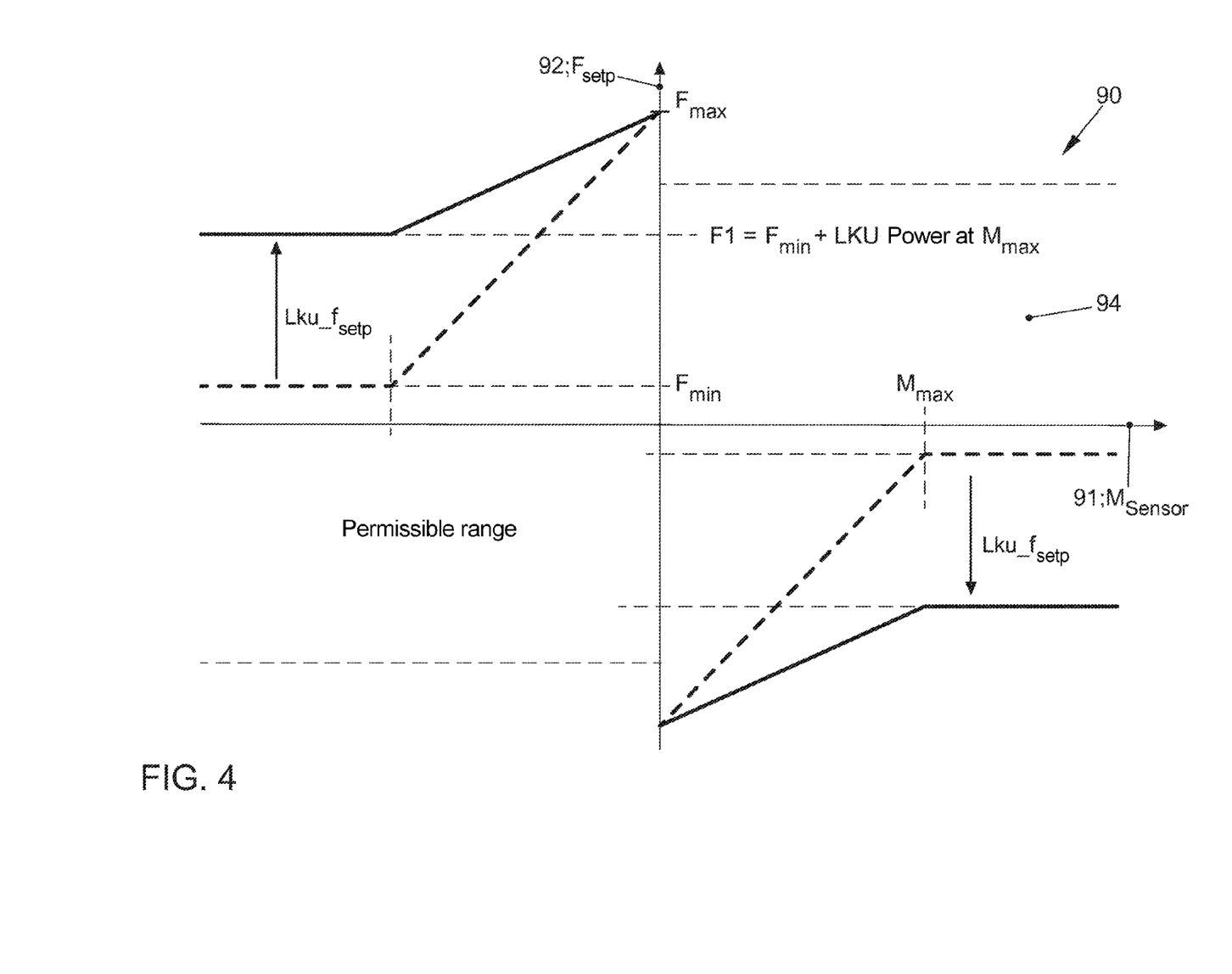
FIGS. 4 and 5 show graphs which illustrate principles and the method of operation of embodiments of the disclosed monitoring function.
Figure 5:
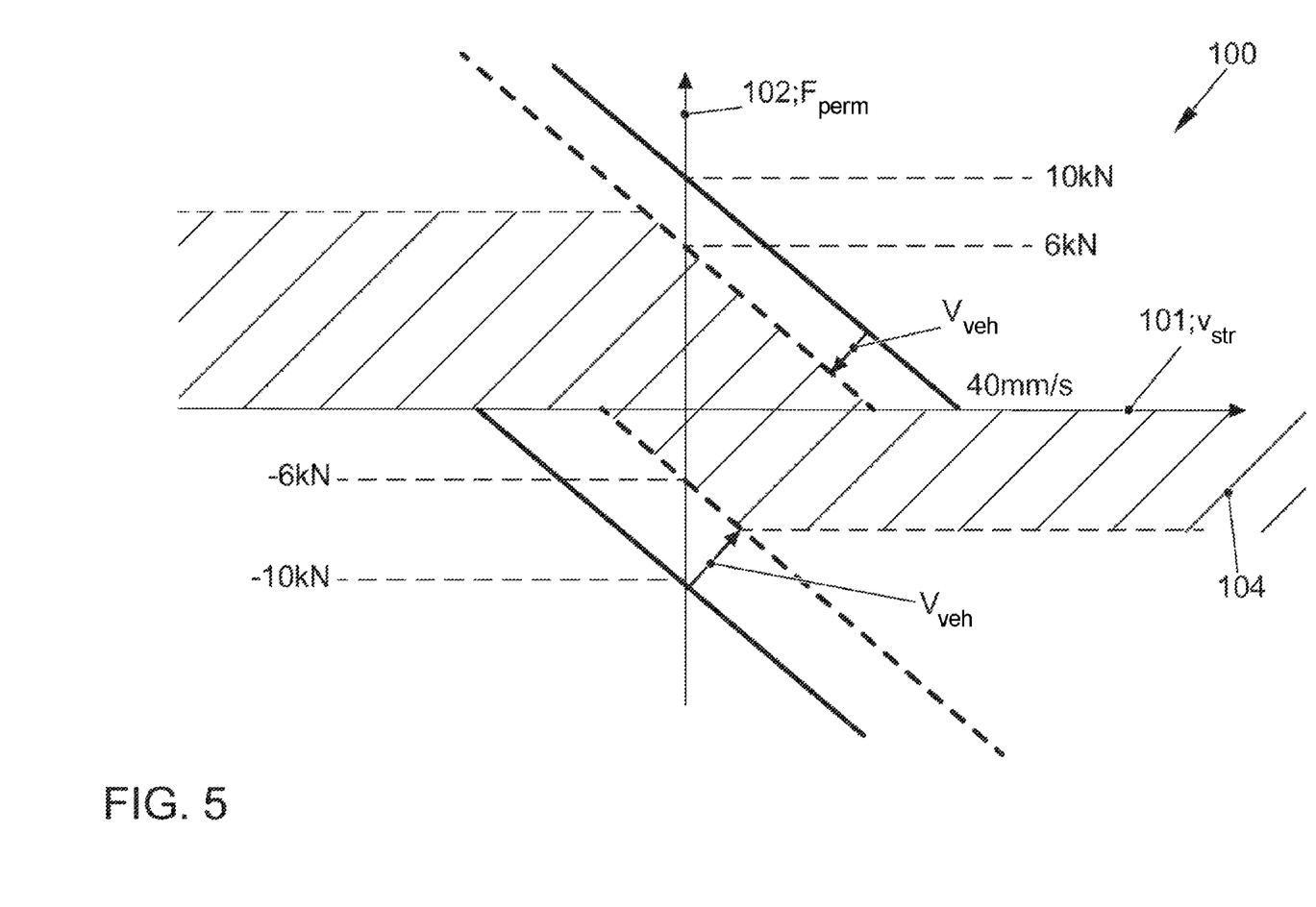

FIGS. 4 and 5 show graphs 90 and 100 which illustrate the principles and method of operation of disclosed embodiments of the monitoring function 80 which is used according to the disclosure.

In the case of the graph 90 in FIG. 4, the actuating force Fsetp is illustrated on the ordinate 92 as a setpoint force and as a function of the value MSensor which is determined by a sensor, for a torque which is applied manually by the driver and is plotted on the abscissa 91. With respect to further parameters, the permissible range, denoted by 94, for the operating parameters Fsetp and MSensor is obtained.

In the case of the graph 100 in FIG. 5, the permissible force Fperm is illustrated on the ordinate 102 as a function of the speed vstr of a steering element 23, 24, 25 of the steering system 20, for example, a steering rack, which is plotted on the abscissa 101.

With respect to further parameters, in particular, the speed Vveh, the range 104 which is permissible for the operating parameters Fperm and vstr is obtained.

Figure 6:
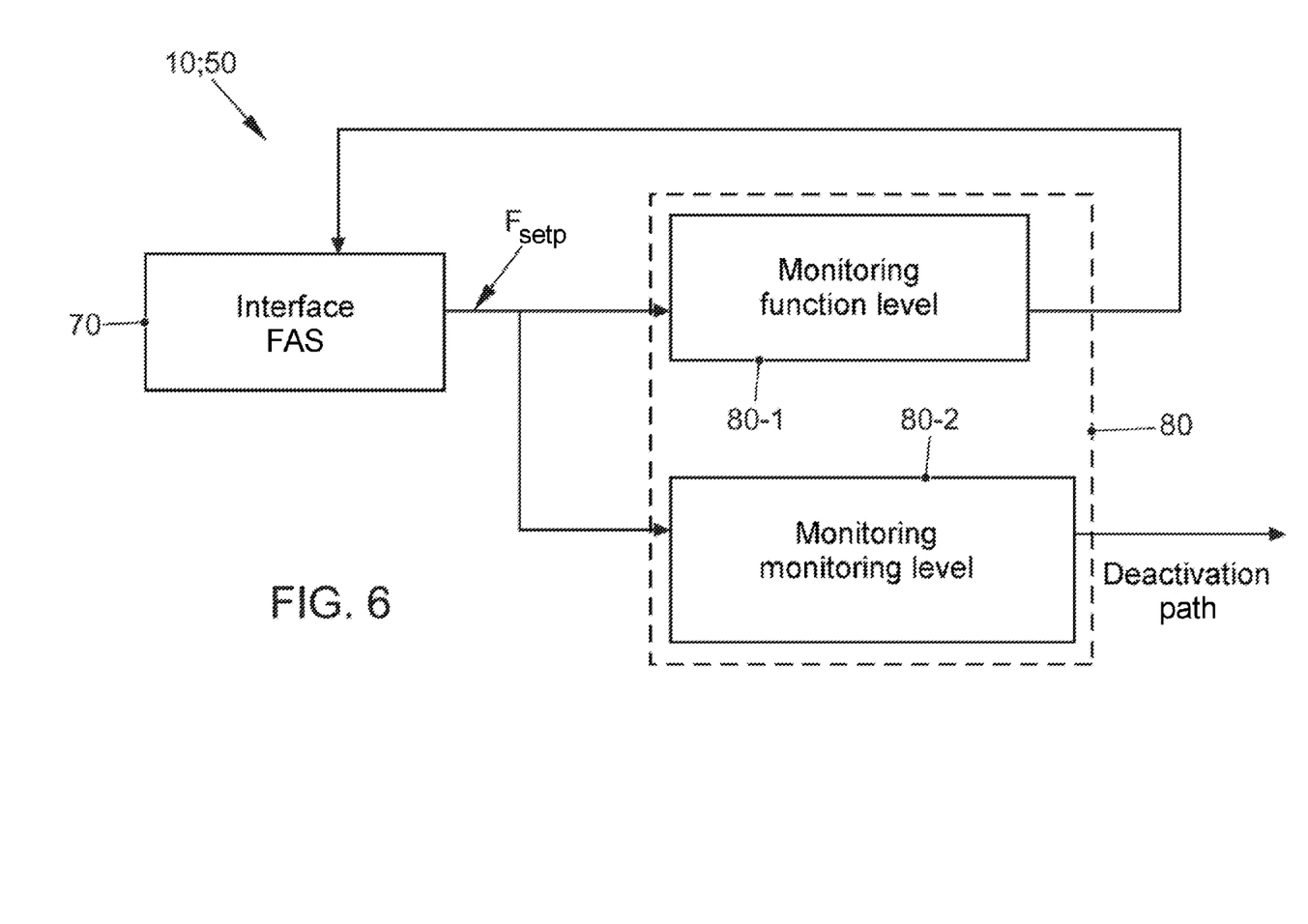
FIG. 6 shows a schematic view of a block diagram showing a sensing and control unit which can be used in conjunction with a disclosed steering assistance method.

FIG. 6 shows a schematic view, in the manner of a block diagram, of an exemplary embodiment of a sensing and control unit 10 which can be used with respect to a disclosed steering assistance method and a steering assistance 50.

In this disclosed embodiment, the monitoring function which is provided is formed firstly on the functional level or steering level as a first component 80-1 and additionally on a monitoring level as a second component 80-2 with respect to a deactivation path. As a result, a malfunction can be avoided with high permissibility.

The disclosed embodiments also relate, inter alia, to a steering system 20 for a transportation vehicle 1 having a functionality for the robust detection of internal faults and faulty external requests, for example, in the case of requests by a driver assistance system 60.

In the case of steering systems 20, inter alia the following properties are considered:

Owing to the classification of electromechanical steering systems as safety-relevant components, in this transportation vehicle component very demanding requests are made with respect to the fail safety, the fault detection and the fault reactions which are to be initiated in the event of a fault. Various measures have to be implemented during the development of steering functions which are implemented on the control device.

Steering functions denote, on the basis of different input signals, the steering assistance force or other component forces which are summed to form an overall setpoint assistance force. A motor setpoint is also calculated from this force and is set by the electric assistance motor as an actuator unit 30 or as a part thereof.

A concept for satisfying demanding safety requests is to assign to each steering function a monitoring function which continuously monitors the correct function of the steering function within defined limits.

The simplest possible way of implementing this concept would be to calculate the function twice and compare the result. This is not satisfactory owing to the demanding requests on the monitoring function with respect to the development process and the necessary testing depth, and also owing to the computational resources which are available only to a limited extent.

The disclosed embodiments develop monitoring functions 80 which are as a simple as possible and which can monitor significantly more complex steering functions.

Basically, more demanding requests are made of the development and testing and also of the processes which are applied during the monitoring function than of the steering function. It is therefore beneficial if a monitoring function uses mechanisms which are simple in terms of software and which can be easily implemented and tested.

Furthermore, relatively undemanding requests are made of the safety integrity of the input variables for the steering functions.

The following circumstances are relevant for the purpose on which the disclosed embodiments are based:

Owing to the demanding requests which are made of the steering sensation, frequently very complex steering functions have to be implemented, in the case of which the output variables cannot be directly inferred from the input variables owing to integrated control algorithms, filters and other internal feedback of signals.

Within the scope of the present disclosure, inter alia a concept is described which permits specifications—e.g., a request of a setpoint steering angle to be safely implemented via a transportation vehicle bus or the like—by driver assistance systems 60 (FAS), because driving situations which the driver cannot cope with can, according to the disclosure, also be excluded in the event of a fault.

One challenge here is that the requests of an FAS 60 at a current time are not insured in such a way that they can be implemented and are allowed to be implemented without further testing of the steering system 20.

Disclosed embodiments are equally functionally capable in different transportation vehicles and on different control devices 10.

This results in the request that the structure which is proposed is made as simple as possible and does not have any dependencies on control-device-specific properties, such as, e.g., sampling rates or the like.

Even though the disclosure has been described in detail with reference to the exemplary embodiments explained in conjunction with the appended figures in the drawings, modifications and combinations of features of the illustrated exemplary embodiments are possible for a person skilled in the art without departing from the scope of the disclosure, whose scope of protection is defined by the appended claims.

The function must be robust with respect to different applications and implementations of the steering assistance force.

The purpose is to prevent a critical driving state caused by a steering-system-internal fault or by a request of a FAS 60 which is not related to the situation. However, the function must be in turn configured in such a way that maneuvers by the driver or by the FAS 60, which are desired or under certain circumstances even very dynamic maneuvers, and which serve to increase the transportation vehicle safety, are permitted.

To achieve this, e.g., inter alia the following procedure is proposed:

A function is illustrated which is arranged in the "monitoring" block of the entire system which is illustrated in FIGS. 1 and 2.

The function monitors a setpoint variable as an output signal of the interface function module 70 which is contained in the steering software.

The setpoint variable can also comprise a plurality of setpoint variables which are summed at a different location.

This ensures that the setpoint variable for the steering assistance motor as an actuator unit 30 cannot assume any values/value profiles which do not give rise to a driving situation which the driver can no longer cope with.

The function 80 is composed of a plurality of parallel sub-testing modules 81 to 85 according to FIG. 3.

In a first partial module 81 monitoring of maximum values of a setpoint variable takes place. If, for example, the absolute value of a setpoint force exceeds a maximum permissible absolute value, a fault reaction 87 is triggered.

In a second partial module 82, the gradient of a setpoint variable is monitored. The criticality limit can be different for rising and falling gradients. In addition, jumps of relatively small amplitude relative to the signal can be permissible, to avoid falsifying the signal profile in the high-frequency range.

In a third module 83, the oversteering capability is monitored, as is illustrated in conjunction with FIG. 4.

Possible input variables are here the sensor torque MSensor, the current steering assistance force FAssistance, the output force Fpos of a position controller, specifically with the parameters Fmax, Fmin, Mmax.

In this context there may be provision that the upper force limit Fpos,Limit and/or the lower force limit Fneg,Limit are determined according to the following relationships (1) to (4), specifically according to $$F_{pos,Limit}(M_{Sensor}, F_{Assistance}) = \tag{1}$$
$$F_{max} + \frac{(F_{max} - F_{min}) \cdot M_{Sensor}}{M_{max}} - \min(F_{Assistance}, 0),$$

if only a lower opposing torque is applied to the steering system of the transportation vehicle by the driver, and therefore $M_{sensor} > -M_{max}$, according to $$F_{pos,Limit}(M_{Sensor}, F_{Assistance}) = \tag{2}$$

$$F_{min} + \min(F_{Assistance}, 0) \cdot \frac{M_{max}}{2 \cdot M_{Sensor} + M_{max}},$$

if a high opposing torque is applied to the steering system of the transportation vehicle by the driver, and therefore $M_{Sensor} \leq -M_{max}$, according to $$F_{neg,Limit}(M_{Sensor}, F_{Assistance}) = \tag{3}$$
$$-F_{max} + \frac{(F_{max} - F_{min}) \cdot M_{Sensor}}{M_{max}} - \max(F_{Assistance}, 0),$$

if only a low opposing torque is applied to the steering system (20) of the transportation vehicle (1) by the driver and therefore $M_{sensor} < M_{max}$ and/or according to $$F_{neg,Limit}(M_{Sensor}, F_{Assistance}) = \tag{4}$$

$$-F_{min} - \max(F_{Assistance}, 0) \cdot \frac{M_{max}}{2 \cdot M_{Sensor} - M_{max}},$$

if a high opposing torque is applied to the steering system (20) of the transportation vehicle (1) by the driver and therefore $M_{sensor} \geq -M_{max}$.

Here, Fpos,Limit denotes the upper force limit, Fneg, Limit denotes the lower force limit, MSensor denotes the manual torque which is measured by a sensor and is applied by the driver of the transportation vehicle (1), Mmax denotes the maximum steering torque, FAssistance denotes the currently applied steering assistance force, Fmin denotes a minimum force, Fmax denotes a maximum force, min denotes the minimum function and max denotes the maximum function.

If the setpoint force Fpos exceeds the upper force limit, an equivalent reaction 87 is to be triggered.

The upper force limit can also be adapted as a function of the action of the steering force assistance 50 and the driver's manual torque.

If the setpoint force Fpos undershoots the lower force limit, an equivalent reaction 87 is to be triggered.

The lower force limit can also be adapted as a function of the action of the steering force assistance 50 and the driver's manual torque.

Within the scope of the disclosed embodiments, it is significant that the current steering force assistance is taken into account by the steering assistance 50 during the calculation of the respective limits. This ensures that the limitation is always selected and is used as is necessary for the current transportation vehicle type with the respective individual steering assistance detection.

In a fourth partial module 84 according to FIG. 5, a corridor or permissible range 104, within which the setpoint variable or the setpoint value of the control variable may lie, is formed from the currently present steering rack speed vstr and the permissible force Fperm.

The steering rack force can be calculated from suitable measurement variables which are present in the system, e.g., from the rotor speed of the assistance motor as an actuator unit 30.

The steering rack force is well suited for the monitoring function 80 because it is independent of a possible variable transmission ratio between the pinion and the steering rack in different transportation vehicles or steering systems.

The steering rack speed vstr can serve as a measure of the dynamics which are introduced into the system of the transportation vehicle per unit of time. The higher the dynamics, the lower the setpoint force may be at this operating point to ensure that the system cannot be placed in a critical state.

The corridor or permissible range 104 is varied in its width in accordance with the transportation vehicle speed Vveh to be able to model this facet of the criticality.

In a fifth partial module 85 it is tested whether a setpoint variable or a setpoint value of a control variable is unequal to zero and also at the same time a request of an FAS 60 is present. This is, if appropriate, also compared with status information transmitted by FAS 60.

In a further disclosed embodiment, an additional possibility is also provided of extending the monitoring limits at very low speed, e.g., below 12 km/h, by a signal.

For this purpose, the status of the requesting FAS 60 is tested for content which is specifically provided for this state. This request is now compared with the transportation vehicle speed. The limits can then be extended. For example, this method is used to permit automatic driving, maneuvering and parking.

In addition, the condition may also apply here that the driver must not take his hands from the steering wheel 21 or that the driver's torque must not exceed a specific limit.

At this point—or also elsewhere—it is also possible to evaluate a torque corrected by a value equal to the inertia of the steering wheel 21 and the steering column 22. If this limit is exceeded, if appropriate the function is aborted and therefore it is also possible to change into the originally described monitoring mode.

In a further disclosed embodiment, the monitoring function 80 is extended to increase the robustness with respect to incorrect triggering and with respect to the differentiated evaluation of the driving situation. It is thus proposed that the monitoring function be implemented a first time as a first monitoring unit 80-1 and a second time as a second monitoring unit 80-2 within the steering function level, as is illustrated in FIG. 6.

In this context, the monitoring function 80 is parameterized overall as a first component 80-1 in the functional level in such a way that fault detection takes place just before fault detection in the monitoring level by the second component 80-2. Therefore, overall measures which prevent undesired system reactions as a result of incorrect triggering of the function in the monitoring level can be initiated in the monitoring function 80. This may be, e.g., resetting of integrators or other functional components.

LIST OF REFERENCE NUMBERS

1 Transportation vehicle
2 Bodywork, frame
4 Wheel
10 Sensing and/or control unit
11 Sensing and/or control line
12 Sensor
14 Sensor
16 Sensor
20 Steering system, steering
21 Steering wheel
22 Steering shaft
23 Track rod
24 Joint, steering joint
25 Wheel carrier
30 Actuator unit
40 Steering assistance controller
50 Steering assistance, steering assistance system
60 Driver assistance system
70 Driver assistance interface
80 Monitoring function
80-1 (First) monitoring unit
80-2 (Second) monitoring unit
81 Partial monitoring function
82 Partial monitoring function
83 Partial monitoring function
84 Partial monitoring function
85 Partial monitoring function
86 Logic operation, OR
87 Trigger, fault reaction
90 Graph
91 Ordinate
92 Abscissa
94 Permissible range
100 Graph
101 Ordinate
102 Abscissa
104 Permissible range

The invention claimed is:

1. A driver-assistance-system-based steering assistance method for a transportation vehicle with a steering system with steering assistance for assisting a driver when steering the transportation vehicle using the steering system, the steering assistance method comprising:
   sensing a driving situation of the transportation vehicle;
   carrying out an intervention into the driving behavior of the transportation vehicle in accordance with the driving situation, wherein the underlying driver assistance system;
   determines a setpoint value for at least one control variable of the steering system, and
   conditionally requests the setpoint value from the steering system via a driver assistance interface,
   wherein a monitoring function connected downstream of the driver assistance system and the driver assistance interface and connected upstream of the request to the steering system brings about a fault action in response to the setpoint value not satisfying a predefined permissibility criterion,
   wherein the fault action causes the driver assistance system to newly determine a setpoint value of a control variable rather than requesting the setpoint value previously determined by the driver assistance system, wherein the newly determined setpoint value of the control variable newly determined by the driver assistance system is monitored by the monitoring function and conditionally requested by the steering system,
   wherein the monitoring function monitors setpoint values, determined by the driver assistance system, and monitors the newly determined setpoint value, of a plurality of control variables by an OR logic operation and/or by summation.

2. The steering assistance method of claim 1, wherein the value of a steering assistance force of a steering assistance torque, of a steering angle and/or a value related to a position and/or orientation of an underlying actuator unit and/or of a steering element activated thereby are/is used as a control variable.

3. The steering assistance method of claim 1, wherein the monitoring function tests a plurality of partial criteria during the testing of the permissibility criterion in a simultaneous and/or parallel state.

4. The steering assistance method of claim 1, wherein the permissibility criterion or a partial criterion is detected or are detected as not being satisfied in response to the setpoint value, determined by the driver assistance system of the least one control variable of the steering system not corresponding to a driving situation which a driver of the transportation vehicle cannot cope with.

5. The steering assistance method of claim 1, wherein:
the monitoring function carries out maximum value monitoring of the setpoint value of the control variable, and/or
the permissibility criterion or a partial criterion is detected or are detected as not satisfied in response to the absolute value of the setpoint value of the control variable exceeding a predefined maximum permissible absolute value.

6. The steering assistance method of claim 1, wherein:
the monitoring function carries out monitoring of a gradient of a setpoint value of a control variable, and/or
the permissibility criterion or a partial criterion is detected or are detected as not satisfied in response to the value of the gradient exceeding a predefined upper limit and/or undershoots a predefined lower limit, wherein short-term and/or high-frequency fluctuations in the setpoint value are treated as a low-pass filter.

7. The steering assistance method of claim 1, wherein:
the monitoring function carries out monitoring of oversteerability, and/or
the permissibility criterion or a partial criterion is detected or are detected as not satisfied in response to the setpoint value of the output force, used as a control variable of an underlying actuator unit as the position encoder of the steering system; exceeding an upper force limit and/or undershoots a lower force limit, wherein
the upper force limit and/or the lower force limit are/is adapted in accordance with the steering force assistance by the steering system and/or in accordance with the steering torque which is manually applied by the driver, and/or
the upper force limit and/or the lower force limit are determined according to the following relationships $$F_{pos,Limit}(M_{Sensor}, F_{Assistance}) = \qquad (1)$$
$$F_{max} + \frac{(F_{max} - F_{min}) \cdot M_{Sensor}}{M_{max}} - \min(F_{Assistance}, 0),$$

in response to only a lower opposing torque being applied to the steering system of the transportation vehicle by the driver, and Msensor>−Mmax, according to:

$$F_{pos,Limit}(M_{Sensor}, F_{Assistance}) = \qquad (2)$$
$$F_{min} + \min(F_{Assistance}, 0) \cdot \frac{M_{max}}{2 \cdot M_{Sensor} + M_{max}},$$

in response to a high opposing torque being applied to the steering system of the transportation vehicle by the driver, and Msensor>−Mmax, according to:

$$F_{neg,Limit}(M_{Sensor}, F_{Assistance}) = \qquad (3)$$
$$-F_{max} + \frac{(F_{max} - F_{min}) \cdot M_{Sensor}}{M_{max}} - \max(F_{Assistance}, 0)$$

in response to only a low opposing torque being applied to the steering system of the transportation vehicle by the driver and Msensor≤−Mmax and/or according to:

$$F_{neg,Limit}(M_{Sensor}, F_{Assistance}) = \qquad (3)$$
$$-F_{max} + \frac{(F_{max} - F_{min}) \cdot M_{Sensor}}{M_{max}} - \max(F_{Assistance}, 0)$$

in response to a high opposing torque being applied to the steering system of the transportation vehicle by the driver and MSensor>−Mmax, $F_{pos,Limit}$ denotes the upper force limit, $F_{neg,Limit}$ denotes the lower force limit, $M_{Sensor}$ denotes the manual torque which is measured by a sensor and applied by the driver of the transportation vehicle, MMax denotes the maximum steering torque, Fassistance denotes the currently applied steering assistance force, Fmin denotes a minimum force, Fmax denotes a maximum force, min denotes the minimum function and max denotes the maximum function.

8. The steering assistance method of claim 1, wherein:
the monitoring function carries out monitoring of the position of the setpoint value of the control variable with respect to a permissibility range which is defined by a current speed of an underlying actuator unit and/or of a steering element which is activated thereby, and/or
the permissibility criterion or a partial criterion is detected or are detected as not satisfied in response to the setpoint value lying outside the current permissibility range, wherein the value of a speed of the transportation vehicle is taken into account when defining the permissibility range.

9. The steering assistance method of claim 1, wherein, for the purpose of plausibility checking, the monitoring function
tests whether, in the case of a setpoint value for the control variable which is different from zero the underlying driver assistance system makes a request to the steering system, and/or
acquires and evaluates possibly present status information of the underlying driver assistance system.

10. The steering assistance method of claim 1, wherein the monitoring function is configured:
to extend parameter boundaries when monitoring a setpoint value of a control variable at speeds of the transportation vehicle which undershoot a predefined minimum speed, and/or
to sense and take into account the presence of a driver in the transportation vehicle, contact of the driver with the steering wheel of the steering system and/or inertia of the steering wheel of the steering column and/or of the steering shaft, and/or
to form a first monitoring unit in the region of the monitoring plane of the steering system and a second monitoring unit in the region of the steering function plane of the steering system.

11. A driver-assistance-system-based steering system assistance for a transportation vehicle with a steering system for assisting a driver when steering the transportation vehicle, with a sensing and control unit to provide driver-assistance-system-based steering assistance wherein:

a driving situation of the transportation vehicle is sensed,
an intervention into the driving behavior of the transportation vehicle is carried out in accordance with the driving situation,
wherein the driver assistance system:
determines a setpoint value for at least one control variable of the steering system, and
conditionally requests the setpoint value from the steering system via a driver assistance interface,
wherein a monitoring function connected downstream of the driver assistance system and the driver assistance interface and connected upstream of the request to the steering system brings about a fault action in response to the setpoint value not satisfying a predefined permissibility criterion,
wherein the fault action causes the driver assistance system to newly determine a setpoint value, of a control variable rather than requesting the setpoint value, previously determined by the driver assistance system, wherein the newly determined setpoint value of the control variable newly determined by the driver assistance system is monitored and conditionally requested by the steering system, and/or
the monitoring function monitors setpoint values, determined by the driver assistance system, and monitors the newly determined setpoint value, of a plurality of control variables by an OR logic operation and/or by summation.

12. A transportation vehicle comprising:
a steering system with driver-assistance-system-based steering assistance for the steering of a movement of the transportation vehicle by a driver, and
wherein the steering assistance system is embodied as claimed in claim 11.

13. The steering assistance system of claim 11, wherein the value of a steering assistance force of a steering assistance torque, of a steering angle and/or a value related to a position and/or orientation of an underlying actuator unit and/or of a steering element activated thereby are/is used as a control variable.

14. The steering assistance system of claim 11, wherein the monitoring function tests a plurality of partial criteria during the testing of the permissibility criterion in a simultaneous and/or parallel state.

15. The steering assistance system of claim 11, wherein the permissibility criterion or a partial criterion is detected or are detected as not being satisfied in response to the setpoint value, determined by the driver assistance system of the least one control variable of the steering system not corresponding to a driving situation which a driver of the transportation vehicle cannot cope with.

16. The steering assistance system of claim 11, wherein:
the monitoring function carries out maximum value monitoring of the setpoint value of the control variable, and/or
the permissibility criterion or a partial criterion is detected or are detected as not satisfied in response to the absolute value of the setpoint value of the control variable exceeding a predefined maximum permissible absolute value.

17. The steering assistance system of claim 11, wherein:
the monitoring function carries out monitoring of a gradient of a setpoint value of a control variable, and/or
the permissibility criterion or a partial criterion is detected or are detected as not satisfied in response to the value of the gradient exceeding a predefined upper limit and/or undershoots a predefined lower limit, wherein short-term and/or high-frequency fluctuations in the setpoint value are treated as a low-pass filter.

18. The steering assistance system of claim 11, wherein:
the monitoring function carries out monitoring of oversteerability, and/or
the permissibility criterion or a partial criterion is detected or are detected as not satisfied in response to the setpoint value of the output force, used as a control variable of an underlying actuator unit as the position encoder of the steering system; exceeding an upper force limit and/or undershoots a lower force limit, wherein
the upper force limit and/or the lower force limit are/is adapted in accordance with the steering force assistance by the steering system and/or in accordance with the steering torque which is manually applied by the driver, and/or
the upper force limit and/or the lower force limit are determined according to the following relationships $$F_{pos,Limit}(M_{Sensor}, F_{Assistance}) = \qquad (1)$$
$$F_{max} + \frac{(F_{max} - F_{min}) \cdot M_{Sensor}}{M_{max}} - \min(F_{Assistance}, 0),$$

in response to only a lower opposing torque being applied to the steering system of the transportation vehicle by the driver, and Msensor>−Mmax, according to:

$$F_{pos,Limit}(M_{Sensor}, F_{Assistance}) = \qquad (2)$$
$$F_{min} + \min(F_{Assistance}, 0) \cdot \frac{M_{max}}{2 \cdot M_{Sensor} + M_{max}},$$

in response to a high opposing torque being applied to the steering system of the transportation vehicle by the driver, and Msensor≤−Mmax, according to:

$$F_{neg,Limit}(M_{Sensor}, F_{Assistance}) = \qquad (3)$$
$$-F_{max} + \frac{(F_{max} - F_{min}) \cdot M_{Sensor}}{M_{max}} - \max(F_{Assistance}, 0)$$

in response to only a low opposing torque being applied to the steering system of the transportation vehicle by the driver and Msensor<Mmax and/or according to:

$$F_{neg,Limit}(M_{Sensor}, F_{Assistance}) = \qquad (3)$$
$$-F_{max} + \frac{(F_{max} - F_{min}) \cdot M_{Sensor}}{M_{max}} - \max(F_{Assistance}, 0)$$

in response to a high opposing torque being applied to the steering system of the transportation vehicle by the driver and MSensor≥−Mmax,
$F_{pos,Limit}$ denotes the upper force limit, $F_{neg,Limit}$ denotes the lower force limit, $M_{Sensor}$ denotes the manual torque which is measured by a sensor and applied by the driver of the transportation vehicle, MMax denotes the maximum steering torque, Fassistance denotes the currently applied steering assistance force, Fmin denotes a minimum force, Fmax denotes a maximum force, min denotes the minimum function and max denotes the maximum function.

19. The steering assistance system of claim 11, wherein:
the monitoring function carries out monitoring of the position of the setpoint value of the control variable with respect to a permissibility range which is defined by a current speed of an underlying actuator unit and/or of a steering element which is activated thereby, and/or the permissibility criterion or a partial criterion is detected or are detected as not satisfied in response to the setpoint value lying outside the current permissibility range, wherein the value of a speed of the transportation vehicle is taken into account when defining the permissibility range.

20. The steering assistance system of claim 11, wherein, for the purpose of plausibility checking, the monitoring function
tests whether, in the case of a setpoint value for the control variable which is different from zero the underlying driver assistance system makes a request to the steering system, and/or
acquires and evaluates possibly present status information of the underlying driver assistance system.

21. The steering assistance system of claim 11, wherein the monitoring function is configured:
to extend parameter boundaries when monitoring a setpoint value of a control variable at speeds of the transportation vehicle which undershoot a predefined minimum speed, and/or to sense and take into account the presence of a driver in the transportation vehicle, contact of the driver with the steering wheel of the steering system and/or inertia of the steering wheel of the steering column and/or of the steering shaft, and/or to form a first monitoring unit in the region of the monitoring plane of the steering system and a second monitoring unit in the region of the steering function plane of the steering system.

\* \* \* \* \*